S. S. HOGLE.
Seeder and Cultivator.
No. 84,121.
Patented Nov. 17, 1868.
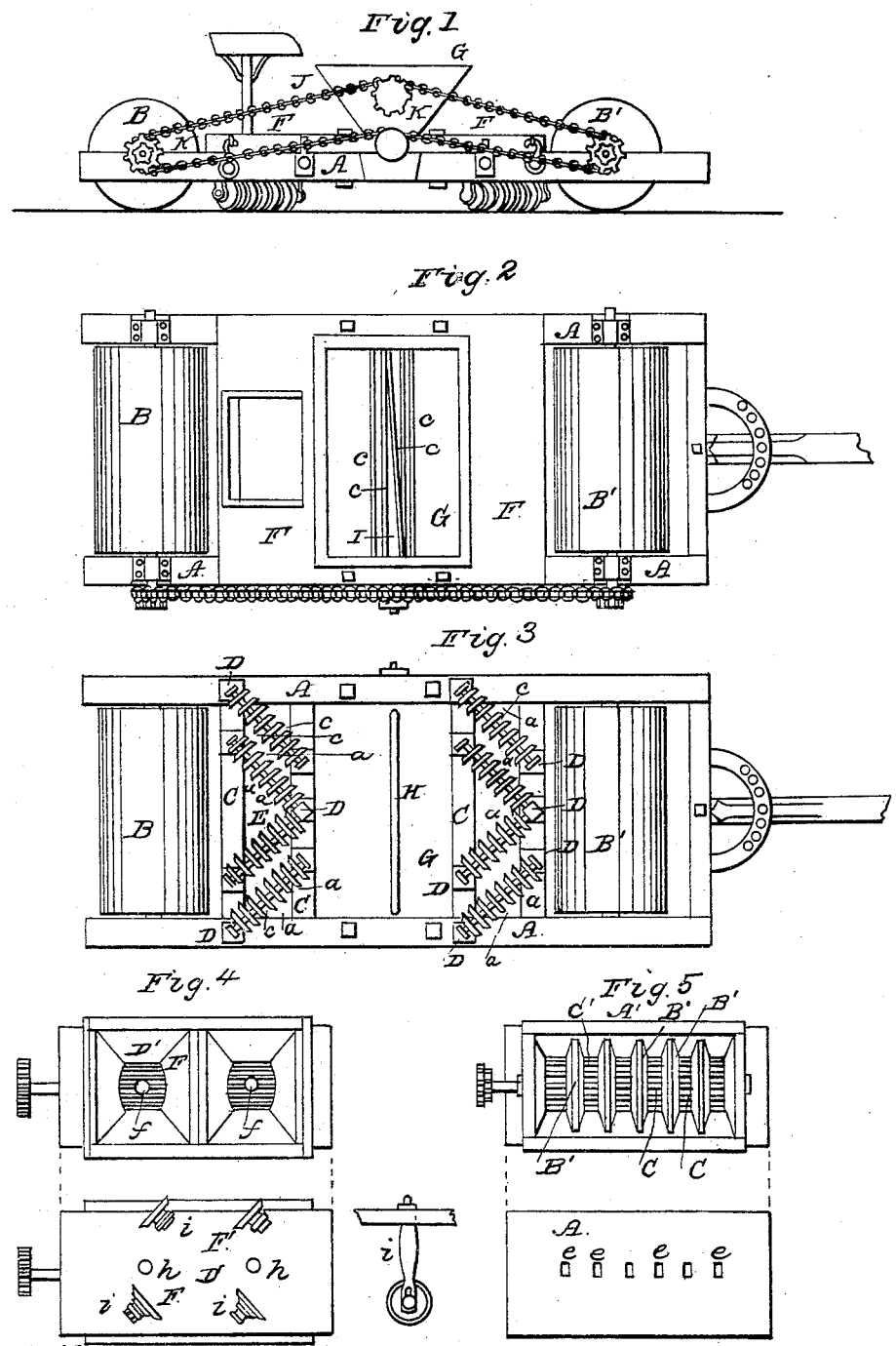
Witnesses
J. H. Burridge
E. E. Waite
Inventor
S. S. Hogle

United States Patent Office.

SIDNEY S. HOGLE, OF BEREA, OHIO.

Letters Patent No. 84,121, dated November 17, 1868.

---

IMPROVEMENT IN SEEDING-MACHINE AND CULTIVATOR COMBINED.

---

The Schedule referred to in these Letters Patent and making part of the same

---

*To all whom it may concern:*

Be it known that I, SIDNEY S. HOGLE, of Berea, in the county of Cuyahoga, and State of Ohio, have invented a certain new and improved Seeding-Machine and Cultivator Combined; and I do hereby declare that the following is a full and complete description of the construction and operation of the same, reference being had to the accompanying drawings, making part of this specification, in which—

Figure 1 is a side view of the machine.
Figure 2, a view of the top.
Figure 3, a view of the under side.
Figures 4 and 5, detached sections.

Like letters of reference refer to like parts in the different views.

This invention is a combined harrow, roller, and seeding-machine, and which is so constructed and arranged that the ground is thoroughly cultivated or harrowed, seeded, and rolled at one continuous and simultaneous operation, thereby saving the time and labor of plowing the ground a second time in order to prepare it for seeding.

In fig. 3, A is an oblong square frame, in each end of which are journalled rollers, B and B'. To the cross-sills, C, is journalled in the stays, D, a system of revolving cultivators, E. Said cultivators consist of a series of disk-shaped cutters or disks, a, arranged upon a shaft, c, and thereon firmly secured, in the order shown in fig. 3, in which it will be seen that they are eight in number, four at or near each end of the frame, immediately behind the rollers, and which are so arranged that each gang of cutters has a diagonal direction across the frame, and at a right angle in their relation to each other. It will also be observed that the cutters or disks, separately considered, have one common direction, viz, the cutting-edge, or the concave side, are all facing the front roller B'; the purpose of which will hereinafter be shown.

For the convenience of access to the several gangs of cultivators, a section, F, of the platform immediately over them is hinged as a trap-door, which, on opening, gives access to the cultivators, for the purpose of oiling, repairs, &c.

G is a seed-box, in the bottom of which is a longitudinal opening, H, fig. 3, for the passage of the seed to the ground.

I is a roller having its bearings in the ends of the seed-box. Said roller is provided with a series of wings or ribs, c, arranged longitudinally across the face of the roller. There are also two wings, d, one of which is shown in fig. 3, arranged in a winding direction across the roller, the purpose of which will hereinafter be shown.

Motion is given to the agitator or roller, I, by means of the endless chain J, which is made to pass around the toothed wheels K, secured to the projecting end of the axles of the rollers B B', and also over a similar wheel on the axle of the agitator; hence, as the rollers revolve, the chain is carried around, thereby giving motion to the agitating-roller referred to.

The two ends of the machine in which the rollers B and B' are journalled are hinged to the central section of the frame, so as to allow of their being turned upward, thereby elevating the rollers, and bringing the cultivators, if need be, deeper into the ground, or so deflecting the frame that they can be raised above the ground, and thus use the rollers independent of the cultivators.

Having thus described the construction and arrangement of the machine, the practical operation of the same is as follows:

The machine is placed in the field, in the position shown in fig. 1, in which it will be seen that the cultivators and roller B touch the ground on the same level, whereas the front roller is slightly raised above it. The uneven ground, lumps, sods, &c., are levelled down by the roller B' as the machine advances. This rolled surface is then cut and stirred up in the most thorough manner by the action of the revolving cutters or cultivators E, loosening the dirt, and reducing it to a proper degree of fineness for receiving the grain, which is dropped broadcast upon the ground from the seed-box G, it being so gauged as to allow a certain quantity to flow out from the opening H referred to, which is then covered by the gang of cultivators E', which follows immediately on the dropped seed, which again stirs the ground and thereby covers the seed, which is then followed by the roller B, which levels down the ground and completes the work of seeding.

In order that the grain shall flow evenly and uniformly from the box, the wings or ribs c keep the grain constantly stirred up in the box, so that it will flow out freely and evenly. The slanting or winding direction given to the wing I gives a sliding or sidewise direction to the outflowing grain, so that it is carried out, rather than driven out, by a direct blow of the straight wings, and is, in consequence, more evenly cast upon the ground.

The operation of the machine, as above described, is for broadcasting, but which may be used for drilling by removing the box G, and using in its place the box A, fig. 5. Said box is divided into compartments by the partitions B', which closely surround the roller C'. In the bottom of each compartment is an opening, e, through which the grain falls to the ground, which, as the machine moves forward, will be in straight parallel rows or drills; the agitator C' keeping the grain constantly stirred in the box, so that it cannot become lodged, and therefore flow out unequally, but, as in the above instance, the grain will run out regularly and equally to the last.

Coarse grain and seeds, as corn, beans, peas, &c., can be sown or rather planted by this machine, by removing the drill-seeding box A' and putting in its place the seed-box D', fig. 4. This box is also furnished with a roller, E', with agitating-wings, as are the rollers in the other seeding-boxes. In the roller of this box are holes, *t*, which will hold from four to five grains of corn.

The arrangement of these holes is such that as the roller turns they come in open relation to the openings *h* in the bottom of each division of the box, and through which the grain contained in the cups or holes *t* falls to the ground at equal and regular distances.

Furrows are made for receiving the grain by the revolving cutters or disks F'. Said disks are pivoted to the lower end of a standard, *i*, attached to and depending from the bottom of the box. The attachment of said disks to the standards is such that they can be raised or lowered by means of a slot in the end of the standard. By this means they can be adjusted to any required depth, and thereby plow a furrow more or less deep, as the nature of the planting may render necessary.

The two front disks plow the furrow, throwing the dirt to one side along the furrow, and into which the corn or other seed is dropped. The two rear disks follow and cover the grain by turning back the dirt upon it, and thus complete the work of seeding.

In each case the ground is first rolled down and then agitated by being cut up and disintegrated to a proper condition of fineness for the seed, which, on being dropped or sown, is again agitated and rolled by the revolving cultivators and roller which follow, leaving the ground level and smooth, and of a fine, deep tilth.

This machine can be used simply as a field-roller, as above said, by elevating the cultivators in the manner as above described, or as a cultivator without the rollers. One set of the cultivators and roller may be used separately, if so needed, and all without the seed-boxes, as a combined cultivator and roller, or as a combination of roller, cultivator, and seeding-machine.

It will be observed that there are two sets of cog-wheels on each of the rollers, one set being much smaller than the others, the purpose of which is to vary the motion of the agitating-rollers in the seed-boxes.

What I claim as my improvement, and desire to secure by Letters Patent, is—

1. The revolving cultivators E, as arranged in combination with the jointed frame A, for the purpose and in the manner substantially as set forth.

2. The combination of the revolving cultivators E and rollers B B', in the manner as and for the purpose specified.

3. The combination of the revolving cultivator E, rollers B B', and seeding-boxes, substantially as and for the purpose specified.

4. The special construction and arrangement of the drill-box A', when operated in the manner as and in combination with the cultivators E and rollers B B', for the purpose described.

5. The slotted standards *i*, revolving cutters or disks F', in combination with the box D, in the manner as and for the purpose set forth.

6. The windings, wings, or ribs *d*, as arranged in combination with wings *c* and roller I, for the purpose set forth.

7. The combinations of the toothed wheels K, rollers B B', agitator I, and chain J, for the purpose specified.

SIDNEY S. HOGLE.

Witnesses:
W. H. BURRIDGE,
FRANK S. ALDEN.